Oct. 5, 1971                H. FLEISSNER                3,609,872
PROCESS AND APPARATUS FOR THE TREATMENT OF TEXTILE MATERIALS
Filed Feb. 14, 1969                              2 Sheets-Sheet 1
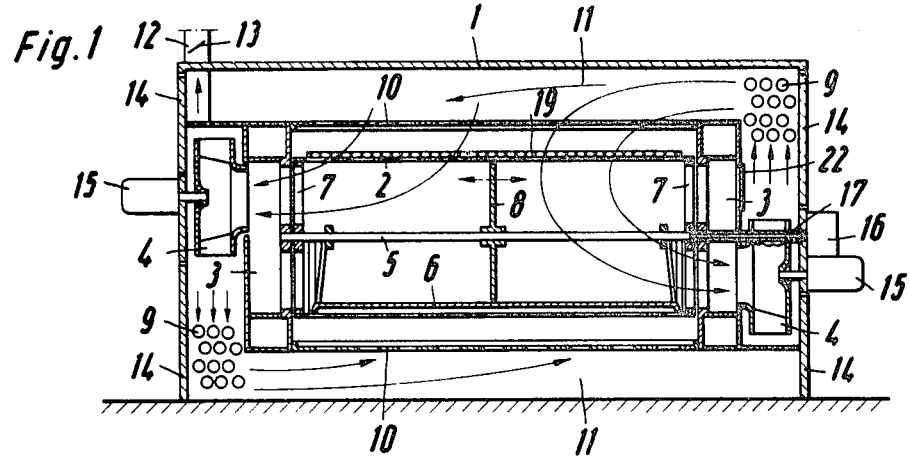
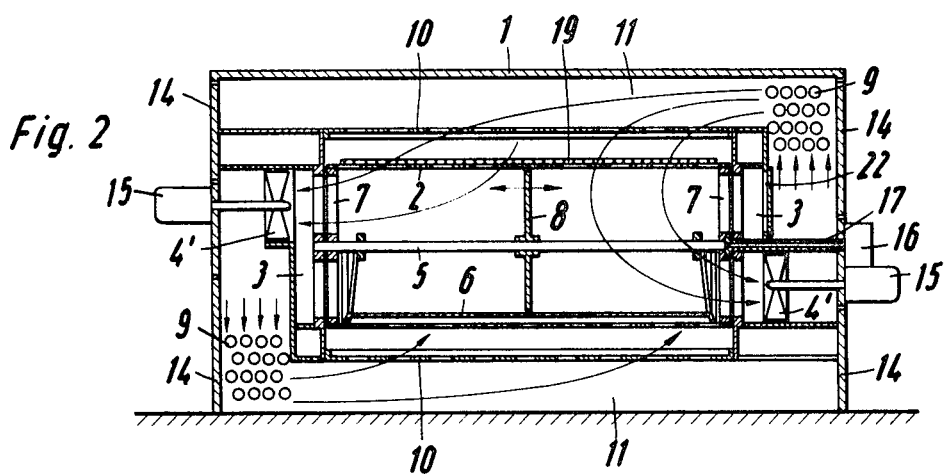
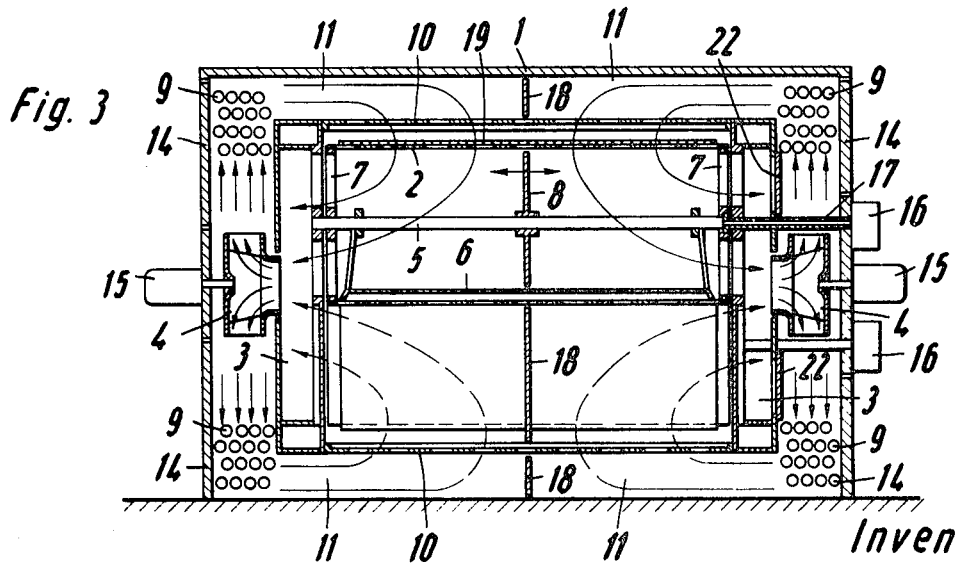
Inventor:
HEINZ FLEISSNER
By Craig, Antonelli, Stewart & Hill
ATTORNEYS

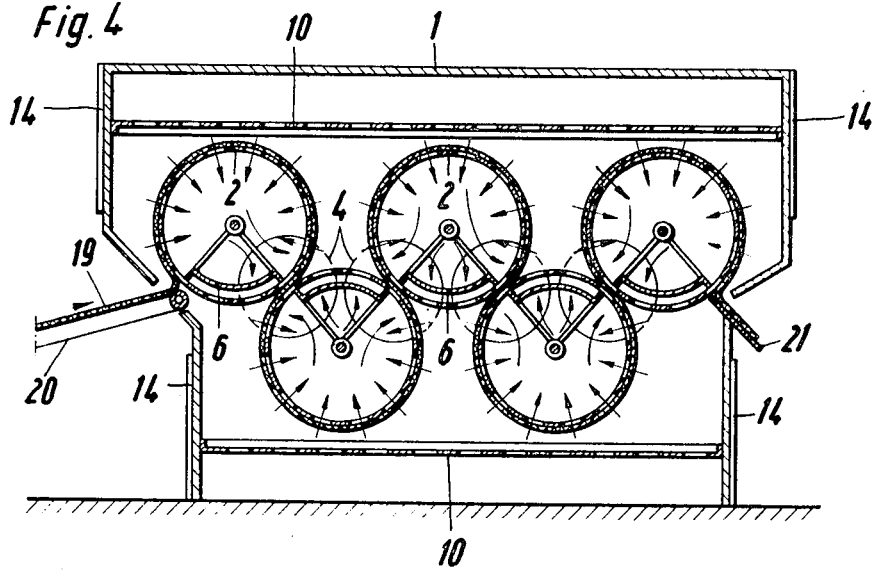
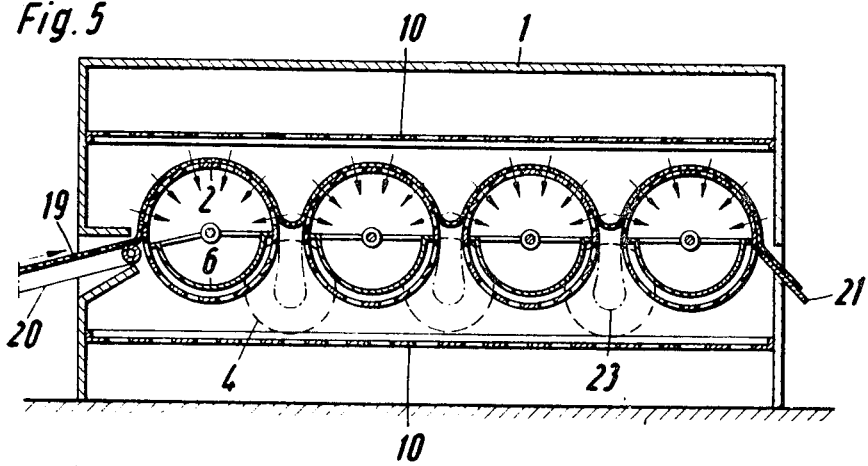
Inventor:
HEINZ FLEISSNER

United States Patent Office
3,609,872
Patented Oct. 5, 1971

3,609,872
PROCESS AND APPARATUS FOR THE TREATMENT OF TEXTILE MATERIALS
Heinz Fleissner, Egelsbach, near Frankfurt am Main, Germany, assignor to Vepa AG
Filed Feb. 14, 1969, Ser. No. 799,224
Claims priority, application Germany, Feb. 14, 1968,
P 17 29 499.4
Int. Cl. F26b 3/00
U.S. Cl. 34—23                                        36 Claims

ABSTRACT OF THE DISCLOSURE

The present disclosure is directed to a process and apparatus for the treatment of textile materials which comprises a treatment chamber, at least one sieve drum means subjected to a suction draft or a positive pressure rotatably mounted in the treatment chamber, inlet means for introducing the material to be treated to the treatment chamber, fan means provided at both faces of the sieve drum means for producing the suction draft or positive pressure and for circulating the treatment medium, bottom means disposed inside the sieve drum means, said bottom means dividing the interior of said sieve drum means into two suction zones and outlet means for removing the material being treated.

BACKGROUND OF THE INVENTION

The present invention relates to a process and apparatus for the treatment of materials, for example textile materials, wherein the apparatus includes a substantially heat-insulated treatment chamber containing at least one conveying means subjected to a suction draft, for example sieve drum means, said sieve drum means being provided with fan means for producing a suction draft and/or a positive pressure and for circulating a gaseous treatment medium, for example air and/or steam, through the material being treated. More particularly, the present invention is directed to the use of adjustable baffle means inside the sieve drum means and in the treatment chamber to divide said areas into respective zones. Also, intermediate chambers are provided at the faces of the sieve drum means, said chambers being utilized to connect several sieve drum means with each other.

Sieve drum dryers subjected to a suction draft are well known in the art. In these dryers the sieve drums may be arranged in one horizontal row or in one vertical row or in two rows staggered with respect to each other. In the well known sieve drum dryers a fan is correlated to each sieve drum at one face thereof, the suction draft of said fan producing a partial vacuum in the sieve drum. Because of the partial vacuum, the material being processed and guided on said sieve drums is held to the drum and penetrated by the gaseous treatment medium. At those portions of the drum which are not covered with the material being treated, the suction draft is interrupted by means of baffles which are arranged in the sieve drums. An automatic material passage from one sieve drum to another sieve drum is possible since the baffles are provided to interrupt the suction draft of one sieve drum where the suction draft of an adjacent sieve drum becomes effective.

Also, it is known to provide in a sieve drum dryer a fan means which is coaxial at the face of the sieve drum. In this design the sieve drum is supported on rolls and is driven by means of said rolls.

However, a two-sided application of the suction draft or positive pressure utilizing two fan means has not yet been employed because this particular arrangement involves the danger that the flow from the two fans will disrupt each other and that these disturbances or air turbulence caused by these disturbances will adversely influence the fans. For example, two fans might have an amplifying effect which would result in pulsating airflows and great losses due to the formation of eddy currents. In such a situation, the efficiency is correspondingly low and also the stress on the fan bearings and on the fan motor is very high causing motor elements to become quickly worn and thereby necessitating their continual replacement.

The advantages of the sieve drum dryer in which the treatment medium is drawn through the material being treated are particularly pronounced for processing textile floor coverings, such as tufteds, carpets, needled felts, and the like. In the case of processing large material widths of about 5 m. and more, it is difficult to provide uniform processing conditions over the entire working width of the apparatus. When utilizing one-sided suction devices, the diameter of the sieve drum must be very large, and devices with sieve drum diameters of up to about 3.5 m. are well known. In addition, devices utilizing sieve drums with a diameter of up to about 10 m. can be built without difficulty. However, it can be readily recognized that the expense of the apparatus is substantially increased where the size of the sieve drum means is increased. Much more economical sieve drum means are those sieve drums with a diameter of, for example, about 1 to 2 m.

SUMMARY OF THE INVENTION

An object of the present invention is to avoid the prior art disadvantages in the treatment of materials, for example, textile materials.

Another object of the present invention is to provide an improved process and apparatus for the air and/or steam-treatment of textile materials wherein large working widths of about 5 to 10 meters can be uniformly processed.

Other objects and further scope of applicability of the present invention will become apparent from the detailed description given hereinafter; it should be understood, however, that the detailed description and specific examples, while indicating preferred embodiments of the invention, are given by way of illustration only, since various change and modifications within the spirit and scope of the invention will become apparent to those skilled in the art from this detailed description.

Pursuant to the present invention, it has been found that the above-mentioned disadvantages may be eliminated and a much improved process and apparatus for the treatment of texile materials may be obtained by providing a conveying system in a treatment chamber which contains a suction or blower system at the two faces of the conveying means which offers substantial advantages when compared with the one-face suction system, particularly in situations where large working widths are involved. In order to eliminate a mutual disturbance of the two fans, it is suggested, to subdivide the inside of the sieve drum into two suction spaces by a bottom means. It is advantageous if this bottom means is adjustably mounted in the direction of the drum axis so that instead of one wide material length, also two material lengths of different widths can be handled or alternatively, only one narrow material length can be processed utilizing only one side of the suction or blower system. In this situation the fan at the other side of the sieve drum may then be switched off. To avoid a zone with reduced suction draft or no suction draft near the bottom means, it is suggested to provide the bottom means with a silghtly smalled diameter than the inside diameter of the sieve drum jacket. An air passage at the inner jacket has no detrimental effects on the treatment process. However, it is also possible to arrange the bottom means obliquely so that the two suction ranges overlap at the material being treated.

In one of the embodiments of the present invention the gaseous treatment medium is drawn out of the sieve drum at one face by means of the fan and returned to said sieve drum uniformly distributed over the entire working width at the top and/or at one face of the sieve drum and the gaseous treatment medium which is drawn out of the sieve drum at the other face by means of the fan is returned to said sieve drum uniformly distributed over the entire working width or drum length at the bottom and/or at the opposite side of the sieve drum.

When using an apparatus containing two or more sieve drums, it is advantageous to combine these sieve drums or at least a group of sieve drums via an intermediate chamber with one or several fan means. In this way the same differential pressure and/or suction draft is produced in all of the sieve drums whether or not the material becomes more or less permeable to the treatment medium with progressive treatment, for example progressive drying. Such a finishing process can be readily reproduced and with more efficiency and accuracy when using a constant differential pressure rather than different or varying differential pressures.

In a further embodiment of the present invention, it is suggested to arrange the fan means staggered to the sieve drums. In this situation it is desirable if said fan means are arranged at an equal distance from the axis of adjacent sieve drums. The fans should be staggered to the extent that the drum axis can be passed to the outside of the apparatus past the fan wheels and through the fan chamber so that the drum drive can be operated centrally.

When using an apparatus in which the sieve drums are arranged in one row, it is suggested to provide the fans at a lower and/or at a higher level than the sieve drum axis, that is, the fan shafts should not be situated flush with the sieve drum axis. This offers the advantage that larger fan wheels can be utilized.

In another embodiment in which the sieve drums are arranged staggered in two rows, it is expedient to provide the fan means in one plane. This plane which extends through the fan shafts may be situated between the two planes of the drum axis of each row and preferably at an equal distance from these drum axes.

Also, in devices in which fans are provided at each face of the sieve drum, these fans may have a two-sided air discharge, so that after having passed the fans, the treatment medium is returned to the treatment chamber and subsequently to the sieve drums at two sides, that is both above and below said sieve drums. Also, with this device it is expedient and desirable if the treatment medium which flows back at two sides from the fan chamber into the treatment chamber is distributed over the entire working width of the sieve drums. Thus, uniform temperature conditions and a constant mixing of the airflows which are drawn off at both sides of the sieve drum are obtained. Such an airflow can be obtained without difficulty in accordance with a further embodiment of the present invention by arranging sieve sheets above and beneath the sieve drums and by subdividing the resulting flow equalizing spaces by sheets or partitions which are arranged at an acute angle to the drum axis into V-shaped or trapezoidal inflow spaces which narrow from the inflow side to the opposite side.

The design of centrally supported sieve drums may be readily obtained with these devices. The sieve drums may consist of a perforated jacket which may be covered with one or several wire meshes and two cart-wheel like drum spiders to which the drum jacket is mounted.

It is well known to support the sieve drums on one stationary axis each, at least at one side of the apparatus and to mount the baffles which are arranged in the sieve drums on said axis. For such a design and for an easy adjustment and/or readjustment of the baffles, it is suggested to pass the axis through one fan chamber and to secure it against turning at the outside of the housing. On the other side of the apparatus the centrally arranged drum drive shaft may be passed to the outside of the apparatus through the fan chamber and connected with the drum drive.

In an apparatus with sieve sheets above and beneath the sieve drums and with a two-sided return of the treatment medium from each fan into the treatment chamber, the return flow spaces or the flow equalizing spaces which are separated from the treatment chamber by the sieve sheets may be subdivided by means of a lengthwise partition and/or partitions into two zones. Also, it is advantageous to arrange this partition and/or these partitions substantially flush with the bottom means in the sieve drum. The partition which subdivides the flow equalizing spaces may be adjustably mounted. However, for such a separate air guidance, it is necessary to provide a temperature control for each separate air flow. Such a separate air flow is advantageous if a material of narrower width which is only guided in one flow circuit is frequently handled on the device. The fans on the other side of the apparatus as well as the heaters which are associated with said fans may then be switched off. It is possible to switch off one heating unit because, as already mentioned, the heating units are provided with a temperature control which operates independent of the other heating units. To ensure easy access to the treatment chamber around the sieve drums, particularly if fans with the two-sided air discharge are used, it is suggested to provide doors at the faces, that is at the inlet and at the discharge side of the housing above and beneath the material inlet and the material discharge.

To provide easy access to the interior of the sieve drums, it is suggested to arranged doors at the two longitudinal sides of the housing and to correlate to these doors manholes which are provided in the lengthwise partition of the intermediate chamber. The manholes are closed by cover means. A repair man may then enter the interior of the drum through these manholes. The treatment chamber surrounding the sieve drums is also accessible alongside the housing if further manholes are provided in the two longitudinal partitions of the intermediate chamber outside the sieve drum range.

The inner lengthwise partition of the intermediate chamber may serve as a support for the sieve drums and may be provided with supporting spiders for the drum axis. Size and shape of the supporting spiders may be similar to those of the drum spiders. For drying the heat-setting devices which are operated with air or with steam-air mixtures, it is suggested to provide the intermediate chamber with suction ports for fresh air which preferably are situated at the rear face of the housing, so that the air exchange is effected on the counter-current principle. However, it is also possible to effect the air exchange on the co-current principle. In this case, the suction ports for fresh air are provided in the front face wall. In a device which is subdivided in several treatment chambers which are provided with fresh air independent of each other, the fresh air can be drawn in at a longitudinal side of the housing and can be passed into the intermeidate chamber through a duct.

BRIEF DESCRIPTION OF THE DRAWINGS

The present invention will become more fully understood from the detailed description given hereinbelow and the accompanying drawings which are given by way of illustration only and thus are not limitative of the present invention and wherein, FIG. 1 is a cross sectional view of a sieve drum means wherein the sieve drums are arranged in one horizontal row;

FIG. 2 is a cross section of the apparatus of the present invention which is similar to that of FIG. 1;

FIG. 3 is a cross section of the apparatus of the present invention wherein the sieve drum means are arranged in two rows which are staggered with respect to each other;

FIG. 4 is a longitudinal section of the apparatus according to FIG. 3; and

FIG. 5 is a longitudinal section of another embodiment of the apparatus of the present invention.

BRIEF DESCRIPTION OF THE PREFERRED EMBODIMENTS

Referring now to the drawings, wherein like reference numerals are used throughout the various views to designate like parts, the apparatus of the present invention comprises a heat-insulated housing 1 which accommodates sieve drums 2. At the two faces of the sieve drum 2 intermediate chambers 3 are arranged which connect several sieve drums 2 with each other. Fans 4 are combined with these intermediate chambers. The sieve drum 2 is supported in drum spiders 7 on a stationary axis 5 which also supports a baffle 6. Furthermore, an adjustable bottom 8 which subdivides the sieve drum into two suction spaces is arranged in the sieve drum.

The treatment medium which is drawn out of the sieve drum 2 through the intermediate chamber 3 by the fans 4 is returned to the treatment chamber over a heating unit 9. In the treatment chamber sieve sheets 10 are provided above and beneath the sieve drum 2 said sieve sheets separating the flow equalizing spaces 11 from the treatment chamber, so that the gaseous treatment medium flows towards the sieve drums 2 uniformly distributed over the entire working width. The treatment medium which is drawn off at the right-hand side of the apparatus according to FIG. 1 is distributed over the entire working width, and a certain amount is drawn in by the fans on the left-hand side. In the same way, an equal amount of the treatment medium which is circulated by the fans on the left-hand side is drawn in by the fans on the right-hand side, so that both airflows are constantly mixed.

Above the fan on the left-hand side, an air discharge 12 with regulating flap 13 is provided. Here, part of the stale air which is enriched with moisture can be discharged. An equal amount of fresh air is supplied to the intermediate chamber 3. To provide ready access to the apparatus, doors 14 are arranged at both longitudinal sides. A fan drive 15 as well as a drum drive 16 are mounted to the outside of the housing 1.

The apparatus according to FIG. 2 is of similar design as that of FIG. 1, with the exception that axial fans 4' are provided instead of the radial fans.

In the apparatus according to FIGS. 3 and 4, the sieve drums 2 are arranged in two rows staggered with respect to each other. Otherwise, the design is substantially similar to that of the apparatus according to FIGS. 1 and 2. Accordingly, the same elements have therefore been noted with the same numerals. Also, here the drum drive shaft 17 is passed through the intermediate suction chamber 3 and the fan chamber to the drum drive 16 which is located outside the housing. On the other side the axis 5 is passed to the outside through the intermediate chamber 3 and the fan chamber and is fixed outside the housing to avoid turning. By loosening the fixture, it is possible to turn the drum axis 5 slightly from outside and to readjust the baffle in this manner.

In the apparatus according to FIGS. 3 and 4, fans with a two-sided air discharge are provided which return the air or the steam which is drawn out of the sieve drums 2 at both sides over heater batteries 9 which are arranged above and beneath the fans 4 into the flow equalizing spaces 11. In this device the flow equalizing spaces 11 are subdivided by means of a lengthwise partition 18, so that it is also possible to cover only half of the sieve drum with material and to switch on only the fan on one side of the sieve drum. However, instead of the lengthwise partitions 18, transverse partitions may also be arranged in the flow-equalizing spaces 11, so that V-shaped or trapezoidal spaces are formed. In this way, the treatment medium which flows back to the sieve drums can be uniformly distributed over the entire working width. Thus, a good exchange of the gaseous treatment medium of the two-sided partial flows is ensured, particularly with a fan utilizing a two-sided air discharge.

As shown in FIG. 4, a material 19 to be processed is passed over a conveyor belt 20 at the inlet of the apparatus to the first sieve drum 2 and is then transported automatically and alternately over the lower and upper surfaces of the sieve drum 2 to the discharge end of the apparatus. At the discharge end of the apparatus the material 19 leaves the treatment chamber over a chute 21. In this device doors 14 are also provided at the faces of the housing. Access to the sieve drum interior is ensured by manholes 22 which are usually provided with covers.

FIG. 5 shows a longitudinal section of another apparatus according to the present invention. In this device the material 19 is only passed over the upper portions of the sieve drums 2, and the material 19 is allowed to hang in loops 23 between the individual sieve drums 2. The fans 4 which are shown by the dashed line are located in this apparatus between two sieve drums 2 and at a lower level than the sieve drums. In this embodiment of the present invention fans 4 with one-sided air discharge are provided which return the airflows at the top above the sieve sheet 10 into the treatment chamber. Otherwise, the design with intermediate chamber 3 is similar to that of the devices according to FIGS. 1 and 2.

The present invention is equally applicable to devices in which blower drums are used instead of suction drums. In this case, the treatment medium flows from the inside to the outside through sieve drums and through the material being conveyed on the surface of the said sieve drums.

The invention being thus described, it will be obvious that the same may be varied in many ways. Such variations are not to be regarded as a departure from the spirit and scope of the invention, and all such modifications as would be apparent to one skilled in the art are intended to be included.

It is claimed:

1. An apparatus for the treatment of textile materials which comprises a treatment chamber, at least one sieve drum means subjected to a suction draft or a positive pressure rotatably mounted in the treatment chamber, inlet means for introducing the material to be treated to the treatment chamber, fan means provided at both end faces of the sieve drum means for producing said suction draft or positive pressure and for circulating the treatment medium, heating means disposed in the circulation zone of the treatment medium, bottom means disposed inside the sieve drum means, said bottom means dividing the interior of said sieve drum means into two suction zones and providing at least two different circulating patterns of the treatment medium from the fans through the material into the interior of the sieve drum and back again through the end faces of the sieve drum to the fans and outlet means for removing the material being treated.

2. The apparatus of claim 1, wherein the drum means is adjustably mounted in the direction of the bottom axis.

3. The apparatus of claim 1, wherein the diameter of the bottom means is slightly smaller than the inside diameter of the sieve drum jacket.

4. The apparatus of claim 1, wherein the bottom means is arranged obliquely in the sieve drum means.

5. The apparatus of claim 1, wherein baffle means are provided at one face of the sieve drum means for directing the treatment medium drawn out of said sieve drum means to the top side of the sieve drum means into the treatment chamber and baffle means are provided at the other face of the sieve drum means for directing the treatment medium drawn out of said sieve drum means to the bottom side of the sieve drum means into the treatment chamber.

6. The apparatus of claim 1, wherein intermediate chambers are provided at each end face of the sieve drum means between said face and the fan means.

7. The apparatus of claim 6, wherein more than one sieve drum means communicates with at least one fan means provided at each of said end faces, through said intermediate chamber.

8. The apparatus of claim 7, comprising more than one sieve drum means wherein the fan means are arranged staggered to the sieve drum means and at an equal distance from the axis of adjacent sieve drum means.

9. The apparatus of claim 7, wherein the fan means at each face of the sieve drum means are provided with means for their independent control.

10. The apparatus of claim 8, wherein the fan means are staggered to the extent that the drum axis passes to the outside of the treatment chamber past the fan means and through the fan chamber.

11. The apparatus of claim 8, wherein the sieve drum means are arranged in one line and the fan means are arranged at a different level than the sieve drum axis.

12. The apparatus of claim 8, wherein the sieve drum means are arranged in two rows and staggered with respect to each other, the fan means for said sieve drum means being disposed in one plane.

13. The apparatus of claim 12, wherein said plane of the fan shafts is disposed between the two planes of the drum axis of each row and at an equal distance from these drum axes.

14. The apparatus of claim 1, wherein the fan means at each end face of the sieve drum means is provided with duct means for discharging the treatment medium drawn out of said sieve drum means to the top side and to the bottom side of the sieve drum means into the treatment chamber.

15. The apparatus of claim 14, wherein sieve sheets are disposed above and below the sieve drum means in the treatment chamber forming flow equalizing spaces, and partition means are provided for subdividing the resulting spaces.

16. The apparatus of claim 15, wherein the partitions are arranged at an acute angle to the drum axis forming V-shaped or trapezoidal inflow spaces which narrow from the inflow side to the opposite side.

17. The apparatus of claim 1, wherein the sieve drum means is mounted on two cart-wheel like drum spiders said sieve drum means comprising a perforated drum jacket which is covered with at least one wire mesh.

18. The apparatus of claim 1, wherein the sieve drum means are unilaterally supported on at least one stationary axis, said axis also providing support for baffle means disposed in the sieve drum means, and passing through one of the fan chambers and secured against turning at the outside of the chamber.

19. The apparatus of claim 18, wherein the drum drive shaft is centrally arranged and passed to the outside through one of the fan chambers for communication with the drum drive.

20. The apparatus of claim 15, wherein the treatment chamber is subdivided by means of the partition means at least in the flow equalizing spaces which are separated by the sieve sheets, said partition being disposed in the same plane as the bottom means in the sieve drum means.

21. The apparatus of claim 20, wherein the partitions are adjustable.

22. The apparatus of claim 20, wherein the heating means are associated with each fan means, said heating means, at each face of the sieve drum means, being independently controlled by control means.

23. The apparatus of claim 1, wherein doors are provided in the treatment chamber at each face at the inlet side and discharge side of the chamber, above and below the material inlet means and material discharge means.

24. The apparatus of claim 1, wherein doors are provided in the longitudinal sides of the treatment chamber and manholes are provided with closures in the longitudinal walls of the intermediate chamber, said doors being directly opposite the manholes.

25. The apparatus of claim 24, wherein a plurality of manholes are provided in the longitudinal walls of the intermediate chamber.

26. The apparatus of claim 6, wherein the inner longitudinal wall of the intermediate chamber serves as a supporting element for the sieve drums and is provided with supporting spiders which are adapted to receive the drum axis, the size and shape of the supporting spiders being approximately similar to those of the drum spiders.

27. The apparatus of claim 1, wherein suction ports for fresh air are situated at the rear face of the treatment chamber, said suction ports communicating with the intermediate chamber.

28. The apparatus of claim 1, wherein suction ports for fresh air are situated at the front face of the treatment chamber, said suction ports communicating with the intermediate chamber.

29. A process for the treatment of textile material which comprises introducing the material to be treated to a treatment chamber, conveying the material being treated on the surface of at least one sieve drum means, said sieve drum means being subjected to a suction draft or a positive pressure at both faces of the sieve drum means, and the interior of said sieve drum means being divided in two suction zones thereby providing at least two circulation patterns of the treatment medium in the treatment chamber from the fans through the material into the interior of the sieve drums and back again through the end faces of the sieve drum to the fans, and heating the treatment medium while it is being circulated in the treatment chamber.

30. The process of claim 29, wherein the treatment medium is drawn out of the sieve drum means at one face and circulated to the top of the treatment chamber and drawn out of the sieve drum means at the other face and circulated to the bottom of the treatment chamber.

31. The process of claim 29, wherein the treatment medium is drawn out of the sieve drum means at both faces of the sieve drum means and circulated to the top and the bottom of the treatment chamber at each of said faces.

32. The process of claim 29, wherein the flow of the treatment medium is interrupted on the inside of the sieve drum.

33. The process of claim 32, wherein the flow of the treatment medium is interrupted in the treatment chamber at substantially the same point as the flow is interrupted inside the sieve drum means.

34. The process of claim 29, wherein the temperature of the treatment medium in each circulation zone is independently controlled.

35. The apparatus of claim 5, wherein the fan means produce a suction draft and the treatment medium evacuated from the sieve drum means by said fan means at the faces of the sieve drum means is re-introduced into the sieve drum means at a certain peripheral angle uniformly over the entire length of the sieve drum means at the top and bottom side, respectively of said sieve drum means.

36. The process of claim 29, wherein the sieve drum means is subjected to a suction draft at both faces of the sieve drum means, and the treatment medium drawn out of the sieve drum means at one face is uniformly distributed at a certain peripheral angle over the entire sieve drum length at the top side of the sieve drum means, and the treatment medium drawn out of the sieve drum means at the other face is uniformly distributed at a certain peripheral angle over the entire sieve drum length at the bottom side of the sieve drum means.

References Cited

UNITED STATES PATENTS

| | | | |
|---|---|---|---|
| 3,345,756 | 10/1967 | Bryand et al. | 34—115 |
| 3,065,551 | 11/1962 | Cohn et al. | 34—115 |

CHARLES SUKALO, Primary Examiner

U.S. Cl. X.R.

34—122